United States Patent [19]

Ito et al.

[11] Patent Number: 4,796,104

[45] Date of Patent: Jan. 3, 1989

[54] VIDEO SIGNAL RECORDING AND REPRODUCING APPARATUS PERFORMING TIME-LAPSE RECORDINGS COMPATIBLE WITH STANDARD-TYPE APPARATUSES

[75] Inventors: Yutaka Ito, Tokyo; Kazuo Negishi; Kohei Yamashita, both of Yokohama, all of Japan

[73] Assignee: Victor Company of Japan, Ltd., Japan

[21] Appl. No.: 34,340

[22] Filed: Apr. 3, 1987

[30] Foreign Application Priority Data

Apr. 7, 1986 [JP] Japan .................................. 61-79595
Apr. 8, 1986 [JP] Japan ........................... 61-52561[U]

[51] Int. Cl.⁴ ............................................ H04N 5/782
[52] U.S. Cl. .................................. 360/10.3; 360/10.1; 360/35.1; 360/70; 360/74.1
[58] Field of Search ......................... 360/10.1–10.3, 360/11.1, 35.1, 70, 71, 72.1, 72.3, 74.1, 84, 64; 358/310, 312, 313, 320, 321, 335, 337, 338

[56] References Cited

U.S. PATENT DOCUMENTS

| | | | |
|---|---|---|---|
| 4,035,843 | 7/1977 | Tanimura | 360/35.1 |
| 4,280,146 | 7/1981 | Misaki et al. | 360/74.1 X |
| 4,283,737 | 8/1981 | Nikami | 360/11.1 X |
| 4,535,367 | 8/1985 | Kanda | 360/10.3 X |
| 4,562,493 | 12/1985 | Nishitani et al. | 360/74.1 |
| 4,607,294 | 8/1986 | Nishitani et al. | 360/74.1 X |
| 4,617,598 | 10/1986 | Tsuruoka et al. | 360/10.3 |
| 4,633,335 | 12/1986 | Yamamoto et al. | 360/35.1 |
| 4,658,319 | 4/1987 | Tripp et al. | 360/11.1 |
| 4,669,002 | 5/1987 | Nishioka et al. | 360/64 |
| 4,672,469 | 6/1987 | Namiki et al. | 360/64 X |

FOREIGN PATENT DOCUMENTS 49-9122  1/1974  Japan .

Primary Examiner—Aristotelis M. Psitos
Assistant Examiner—W. R. Young
Attorney, Agent, or Firm—Andrus, Sceales, Starke & Sawall

[57] ABSTRACT

A helical scan type video signal recording and reproducing apparatus comprises a rotary body mounted with a pair of rotary magnetic heads at positions having an angular separation of approximately 180° on a rotational plane of the rotary body so that the pair of rotary magnetic heads have mutually different height positions along an axial direction of the rotary body, a mechanism for intermittently transporting a magnetic tape which is wrapped obliquely around a peripheral surface of the rotary drum for a predetermined angular range, and a circuit for successively recording and reproducing while the magnetic tape is stationary video signals each amounting to one field on and from a pair of successive tracks by the pair of rotary magnetic heads in time lapse recording and reproducing modes.

14 Claims, 7 Drawing Sheets

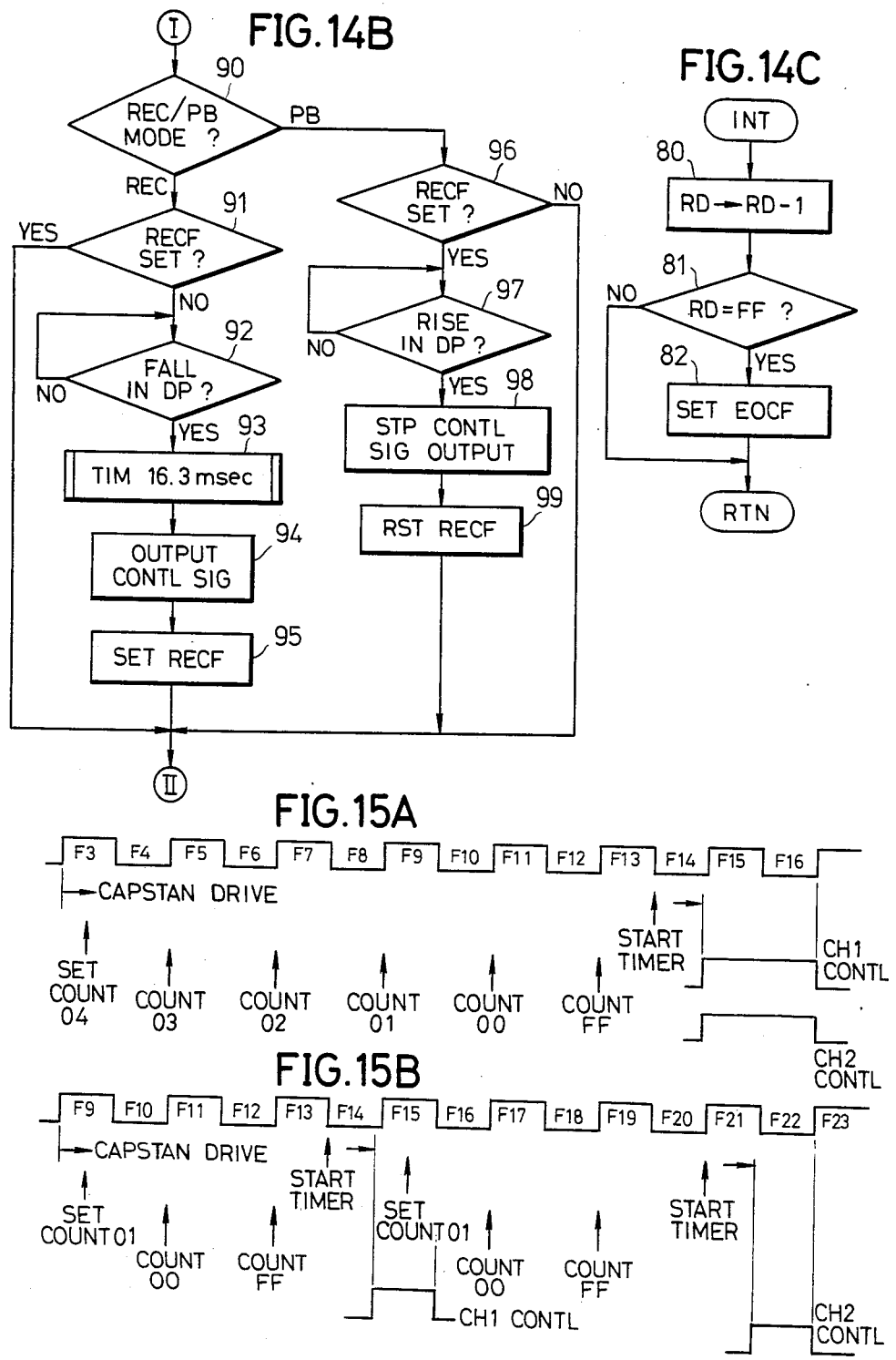

VIDEO SIGNAL RECORDING AND REPRODUCING APPARATUS PERFORMING TIME-LAPSE RECORDINGS COMPATIBLE WITH STANDARD-TYPE APPARATUSES

BACKGROUND OF THE INVENTION

The present invention generaly relates to video signal recording and reproducing apparatuses, and more particularly to a video signal recording and reproducing apparatus having a time lapse mode in which a magnetic tape is transported intermittently and a video signal is recorded on and reproduced from the magnetic tape by use of rotary magnetic heads while the magnetic tape is stationary.

Conventionally, as one kind of helical scan type magnetic recording and reproducing apparatus (hereinafter referred as a video tape recorder or simply VTR), there is the so-called time lapse VTR. The time lapse VTR has time lapse modes in which a magnetic tape is transported at tape speeds different from those used in standard modes of an existing standardized VTR. In the time lapse recording mode of the time lapse VTR, the magnetic tape is continuously transported at a slow speed or is transported intermittently so as to record the video signal by field sampling. As a result, it is possible to record the video signal up to 240 hours, for example, by use of a magnetic tape which is designed to provide two hours of play in the standard mode of the standardized VTR.

The time lapse VTR is used for detailed analysis by reproducing the recorded video signal, or for storing specific reproduced still pictures for a long period of time. Hence, the time lapse VTR is suited for use in a monitoring system such as a security system, a system for operation analysis or recording the circulation of goods, a system for recording broadcasted programs in a television broadcasting station, a system for recording and analyzing observation data obtained in a research center for an extended period of time, and the like.

In the time lapse VTR, it is possible to transport the tape intermittently and record the video signal on the intermittently transported magnetic tape by use of rotary magnetic heads in the so-called still picture recording mode.

However, according to the time lapse VTR of a first type (hereinafter referred to as a first time lapse VTR), a pair of rotary magnetic heads are mounted at diametrical positions on a rotational plane of a rotary body at the same height position along the axial direction of the rotary body. For this reason, in the still picture recording mde, scanning loci of the pair of rotary magnetic heads are identical on the magnetic tape, and it is only possible to form and record the video signal on one track. In order to successively form tracks on the magnetic tape, the video signal amounting to one field must be recorded on one track of the stationary magnetic tape, the magnetic tape must be transported a distance of one track pitch and stopped, and the video signal amounting to another one field must be recorded on the next one track of the stationary magnetic tape. In other words, the magnetic tape must be transported intermittently in the still picture recording mode, and the video signal amounting to one field is recorded on one track and the video signal amounting to another field is recorded on the next one track, where the other field occurs a predetermined time after the one field. Such intermittent tape transport and recording of the video signal on the track of the stationary magnetic tape are repeated in the still picture recording mode. Since the distance of one track pitch is an extremely short distance, the intermittent tape transport must be controlled with an extremely high accuracy. But in actual practice, there is a problem in that it is extremely difficult to carry out the control with such a high accuracy due to inertia of a motor and the like.

On the other hand, there is the time lapse VTR of a second type (hereinafter referred to as a second time lapse VTR) which transports the magnetic tape intermittently between recordings and records the video signal while the magnetic tape is transported at a slow tape speed in the still picture recording mode. In the still picture recording mode of this second time lapse VTR, the pair of rotary magnetic heads successively record the video signal on a pair of successive tracks of the magnetic tape which is transported at the slow tape speed, and the magnetic tape is then stopped. Such intermittent tape transport and recording of the video signal on the pair of successive tracks of the slowly transported magnetic tape are repeated in the still picture recording mode. Hence, a video signal amounting to two fields or one frame is recorded on each pair of successive tracks. Compared to the first time lapse VTR which records the video signal amounting to one field on each track in one recording operation, the second time lapse VTR can obtain a reproduced picture having a vertical resolution two times that obtainable in the first time lapse VTR because the video signal amounting to one frame is recorded on each pair of successive tracks in one recording operation. However, this means that the tape utilization efficiency is one-half that of the first time lapse VTR. Furthermore, in the second time lapse VTR, the video signal amounting to one frame recorded on each pair of successive tracks is made up of first video information amounting to one field and second video information amounting to one field having a time difference of 1/60 sec with the first video information, and the correlation between the first and second video information is extremely high. As a result, there is also a problem in that the recording density obtainable in a predetermined time period is essentially one-half that obtainable in the same predetermined time period on the first time lapse VTR.

On the other hand, it would be very useful if the magnetic tape recorded on the time lapse VTR were compatibly playable on the existing standardized VTR and vice versa. In this case, it would be unnecessary to design a special apparatus exclusively for playing the magnetic tape recorded on the time lapse VTR.

In order to make the track pattern on the magnetic tape recorded on the time lapse VTR compatibly playable on the standardized VTR, the pair of rotary magnetic heads of the time lapse VTR must have gaps of mutually different azimuth angles. But since the magnetic tape is stationary in a still picture reproduction mode of the standardized VTR, it is impossible to obtain reproduced outputs from both rotary magnetic heads of the standardized VTR in the case of the magnetic tape recorded on the first time lapse VTR. It is possible to conceive such an arrangement in the first time lapse VTR that one of the rotary magnetic heads has a wider track width than the other so that the reproduced outputs are obtainable from both the rotary magnetic heads of the standardized VTR. However, in this case, the magnetic tape recorded in a standard recording mode of the first time lapse VTR will be non-compatible with the standardized VTR because of the different track widths of the rotary magnetic heads. In other words, it is impossible to make the magnetic tape recorded on the first time lapse VTR compatibly playable on the standardized VTR regardless of the recording mode used in the first time lapse VTR.

In addition, since the magnetic tape is stationary in the still picture reproduction mode of the standardized VTR, scanning loci of the rotary magnetic heads in the still picture reproduction mode are different from those in the still picture recording mode of the second time lapse VTR in which the magnetic tape is transported at the slow tape speed. Hence, there is a problem in that the picture quality of the reproduced still picture becomes deteriorated due to the difference in scanning loci of the rotary magnetic heads between the still picture recording mode and the still picture reproduction mode of the standardized VTR. Thus, it is impossible to make the magnetic tape recorded on the second time lapse VTR compatibly playable on the standardized VTR regardless of the recording mode used in the second time lapse VTR.

SUMMARY OF THE INVENTION

Accordingly, it is a general object of the present invention to provide a novel and useful video signal recording and reproducing apparatus in which the problems described heretofore are eliminated.

Another and more specific object of the present invention is to provide a video signal recording and reproducing apparatus comprising rotary magnetic heads which scan a magnetic tape with such a track pattern that the magnetic tape recorded in a time lapse (still picture) recording mode thereof is compatibly playable in a standard reproduction mode of an existing standardized VTR and a magnetic tape recorded in a standard recording mode of the existing standardized VTR is compatibly playable in a time lapse reproduction mode of the apparatus according to the present invention.

Still another object of the present invention is to provide a video signal recording and reproducing apparatus comprising a rotary body mounted with a pair of rotary magnetic heads at approximately diametrical positions on a rotational plane of the rotary body so that height positions of the pair of rotary magnetic heads are mutually different along an axial direction of the rotary body, means for intermittently transporting a magnetic tape which is wrapped obliquely around a peripheral surface of the rotary drum for a predetermined angular range in a time lapse mode, recording and reproducing means for successively recording and reproducing while the magnetic tape is stationary in the time lapse mode video signals each amounting to one field but related to mutually different fields having therebetween an interval of a predetermined number of fields on and from a pair of tracks by the pair of rotary magnetic heads or for successively recording and reproducing while the magnetic tape is stationary video signals amounting to two successive fields on and from a pair of tracks by the pair of rotary magnetic heads, and compensating means for electrically or mechanically compensating for a difference between a relative scanning velocity between the magnetic tape and the scanning head in the time lapse mode and a relative scanning velocity between the magnetic tape and the scanning head in a standard mode of a standardized VTR. According to the video signal recording and reproducing apparatus of the present invention, the magnetic tape recorded on the apparatus of the present invention is compatibly playable on the standardized VTR and vice versa.

Other objects and further features of the present invention will be apparent from the following detailed description when read in conjunction with the accompanying drawings.

BRIEF DESCRIPTION OF THE DRAWINGS

FIGS. 14A through 14C are flow charts for explaining an operation of a microcomputer when the microcomputer is used to carry out the functions of certain parts of the apparatus shown in FIG. 1; and FIGS. 15A and 15B are diagrams for explaining the operation of the microcomputer for the frame recording mode with the recording time of 12 hours and the field recording mode with the recording time of 12 hours, respectively.

DETAILED DESCRIPTION

Figure 1:
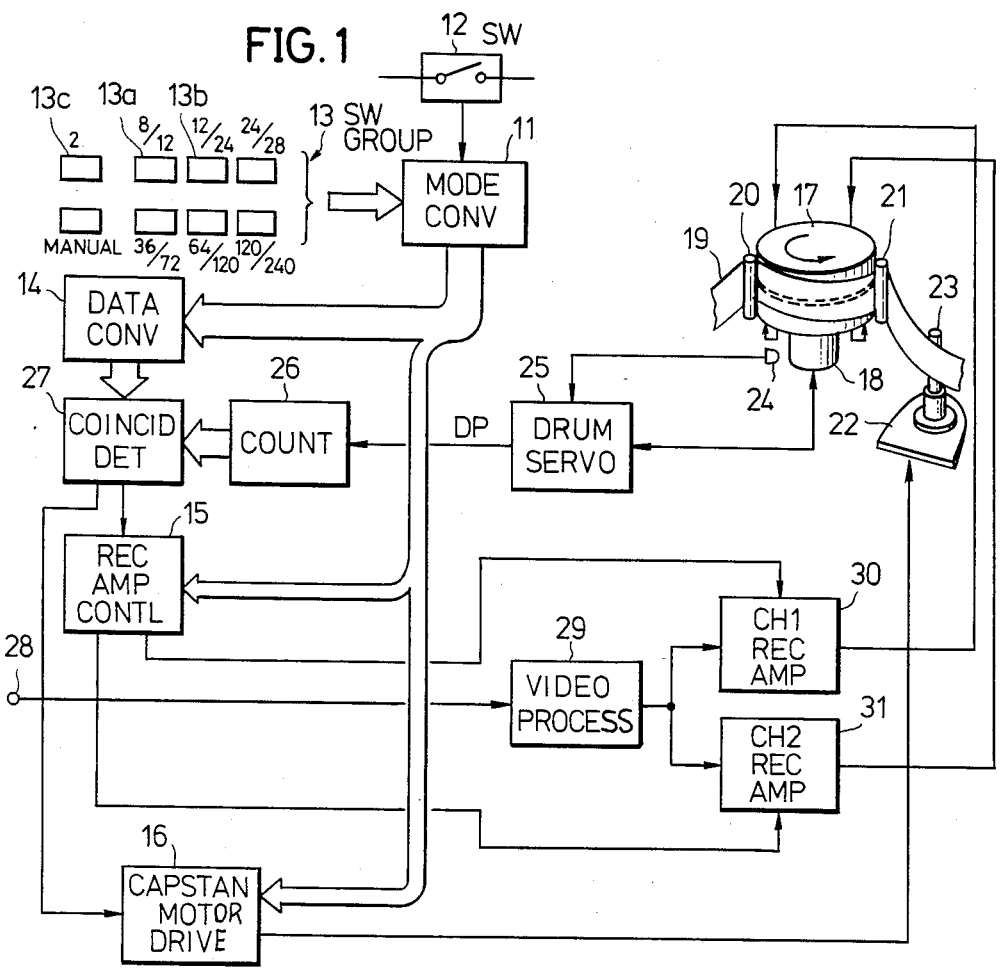
FIG. 1 is a system block diagram showing a first embodiment of the video signal recording and reproducing apparatus according to the present invention.

FIG. 1 is a system block diagram showing a first embodiment of the video signal recording and reproducing apparatus according to the present invention. In FIG. 1, a mode data converting part 11 produces a predetermined mode datum based on signals obtained from a recording mode selection switch 12 and a time section switch group 13. The recording mode selection switch 12 is used to either select the recording mode to a field recording mode or a frame recording mde depending on ON/OFF state thereof. One of the switches in the time selection switch group 13 is manipulated to set the recording time on a magnetic tape. For example, assuming that a magnetic tape used is designed to provide two hours of play in a standard recording (and reproduction) mode of the existing standardized VTR, a swtich 13a sets the recording time to 8 hours in case the frame recording mode is selected by the recording mode selection switch 12, and sets the recording time to 12 hours in case the field recording mode is selected by the recording mode selection switch 12. In this case where the switch 13a is manipulated, the apparatus is set to a time lapse (still picture) recording mode having the recording time of 8 or 12 hours.

The following Table 1 shows an embodiment of the mode datum produced from the mode datum converting part 11 for the field and frame recording modes with each of the recording times, where MD0 through MD3 are four bits constituting the mode datum. A commercially available encoder or a microcomputer may be used to produce the mode datum according to the Table 1.

TABLE I

| MODE DATUM BIT | SW IN SW GROUP 13 |  |  |  |  |  |  |  |
|---|---|---|---|---|---|---|---|---|
|  | 2 | 8/12 | 12/24 | 24/48 | 36/72 | 60/120 | 120/240 | Manual |
| MD0 | 0 | 1 | 0 | 1 | 0 | 1 | 0 | 1 |
| MD1 | 0 | 0 | 1 | 1 | 0 | 0 | 1 | 1 |
| MD2 | 0 | 0 | 0 | 0 | 1 | 1 | 1 | 1 |
| MD3 | 0 | 0/1 | 0/1 | 0/1 | 0/1 | 0/1 | 0/1 | 0 |

The mode datum from the mode datum converting part 11 is supplied to a data converting part 14 and is converted into an intermittent datum for instructing intermittent tape transport. The mode datum from the mode datum converting part 11 is also supplied to a recording amplifier control circuit 15 and a capstan motor intermittently driving circuit 16.

Figure 2:
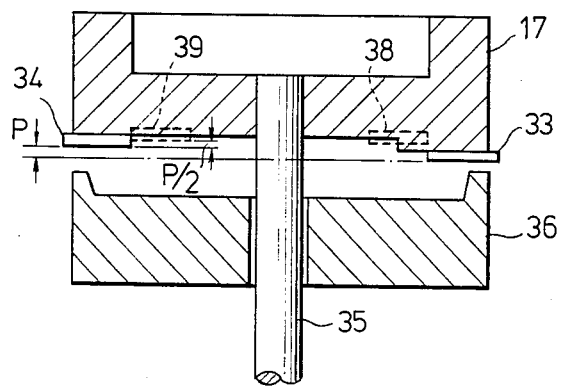
FIG. 2 is a cross sectional view showing an embodiment of a rotary drum of the apparatus shown in FIG. 1.
Figure 3:
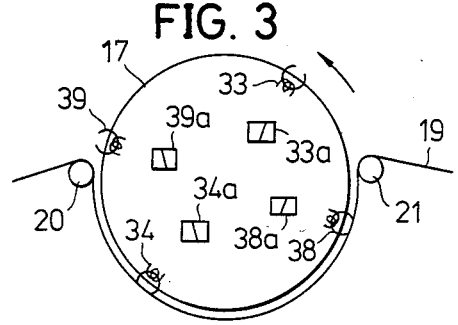
FIG. 3 is a plan view showing the rotary drum together with a magnetic tape.

In the present embodiment, a rotary drum 17 is used as a rotary body provided with rotary magnetic heads. The rotary drum 17 is rotated at a predetermined rotation frequency by a drum motor 18. As shown in FIGS. 1 and 3, a magnetic tape 19 is guided by guide poles 20 and 21 and is wrapped obliquely around a peripheral surface of the rotary drum 17 for a predetermined angular range slightly greater than 180°. In addition, as shown in FIGS. 2 and 3, a pair of rotary magnetic heads (hereinafter simply referred to as heads) 33 and 34 are mounted on a lower part of the rotary drum 17 at diametrical positions on a rotational plane of the rotary drum 17 so that height positions of the heads 33 and 34 mutally differ by a distance P along an axial direction of the rotary drum 17. The distance P is set to one track pitch (for example, 58 microns) of a track pattern which will be described later. As shown in FIG. 3, the head 33 has a gap of an azimuth angle 33a, the head 34 has a gap of an azimuth angle 34a, and the azimuth angles 33a and 34a are mutually opposite. Furthermore, as shown in FIG. 2, a rotary shaft 35 of the drum motor 18 penetrates a center hole in a lower stationary drum 36, and a tip end of the rotary shaft 35 is fixed to a central part of the rotary drum 17 which is arranged above the stationary drum 36.

The rotary drum 17 is also mounted with a pair of rotary magnetic heads 38 and 39 at diametrical positions on a rotational plane of the rotary drum 17. The heads 38 and 39 respectively have gaps of mutually opposite azimuth angles 38a and 39a, and are mounted at the same height position along the axial direction of the rotary drum 17. The aximuth angles 38a and 33a are the same, and the azimuth angles 39a and 34a are the same. The heads 38 and 39 are used in the standard recording (and reproduction) mode in which the tape 19 is continuously transported at a standardized tape speed employed in the standard recording (and reproduction) mode of the standardized VTR. The heads 38 and 39 are used when a switch 13c shown in FIG. 1 is manipulated. Detailed description on the actual recording and reproducing operations using the heads 38 and 39 and illustration of the reproducing system will be omitted because such operations are known.

Returning now to the description of FIG. 1, the rotation of the drum motor 18 is detected by a rotation detector 24, and an output detection signal of the rotation detector 24 is supplied to a drum servo circuit 25. As is well known, the drum servo circuit 25 produces a control signal for rotating the drum motor 18 at a predetermined constant rotation frequency, and supplies this control signal to the drum motor 18. In addition, the drum servo circuit 25 generates a symmetrical square wave (hereinafter referred to as a drum pulse signal DP) having a period of two fields and having a polarity which is inverted for every one-half revolution of the rotary drum 17, that is, for every one field. The drum pulse signal DP is supplied to a counter 26.

A coincidence detecting circuit 27 compares the intermittent datum described before and a counter datum from the counter 26, and generates a coincidence signal every time the two compared data coincide. The coincidence signal is supplied to the recording amplifier control circuit 15 and the driving circuit 16. Based on the coincidence signal and the mode datum described before, the recording amplifier control circuit 15 supplies operation control signals to first and second channel recording amplifiers (hereinafter referred to as CH1 and CH2 amplifiters) 30 and 31 with predetermined timings dependent on the instructed recording time.

Accordingly, a video signal applied to an input terminal 28 is processed and converted into a processed video signal having predetermined signal format suited for magnetic recording in a video signal processing circuit 29. The processed video signal from the video signal processing circuit 29 is supplied in parallel to the CH1 and CH2 amplifiers 30 and 31, but the processed video signal is amplified and obtained from only one of the CH1 and CH2 amplifiers 30 and 31 which is made operative, and no processed video signal is obtained from the other of the CH1 and CH2 amplifiers 30 and 31 which is made inoperative. The output processed video signals of the CH1 and CH2 amplifiers 30 and 31 are independently supplied to the heads 33 and 34 via rotary transformer means (not shown) as is well known.

Based on the coincidence signal and the mode datum, the driving circuit 16 generates a driving control signal for starting the transport of the tape 19 immediately after the formation of two tracks are completed by the heads 33 and 34 and for stopping the tape transport when the tape 19 is transported a distance of two track pitches (=2P). This driving control signal is supplied to a capstan motor 22. The capstan motor 22 is rotated intermittently responsive to the driving control signal, and a capstan 23 rotates intermittently together with a rotary shaft of the capstan motor 22. The tape 19 is pinched between the capstan 13 and a pinch roller (not shown), and thus, the tape 19 is transported intermittently. In other words, an operation in which the tape 19 is transported the distance of two track pitches and stopped for a predetermined time is carried out repeatedly.

Figure 4:
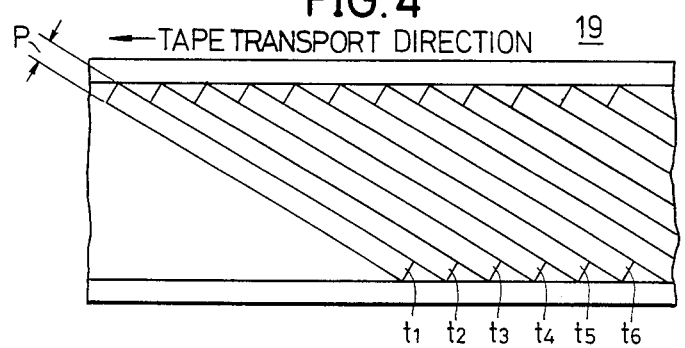
FIG. 4 shows a track pattern formed on the magnetic tape in a time lapse (still picture) recording mode of the apparatus shown in FIG. 1.

As a result, two tracks are formed on the tape 19 during every time period in which the tape transport is stopped after the tape 19 is transported the distance of two track pitches, and a track pattern shown in FIG. 4 is formed on the tape 19. In FIG. 4, tracks $t_1, \ldots, t_6, \ldots$ are alternately formed by the heads 33 and 34, and in the present embodiment, no guardband is formed between two mutually adjacent tracks. However, it is of course possible to provide a guardband between two mutually adjacent tracks. As will be described later, the odd numbered tracks $t_1, t_3, t_5, \ldots$ are each recorded with a video signal related to an odd field by the head 33. On the other hand, the even numbered tracks $t_2, t_4, t_6, \ldots$ are each recorded with a video signal related to an even field by the head 34. Between the two mutually adjacent tracks (for example, $t_1$ and $t_2$) repsectively recorded with video signals related to the odd and even fields, positions where horizontal synchronizing signals are recorded are aligned and the so-called H-alignment exists.

Accordingly, although scanning loci of rotary magnetic heads in a standard reproduction mode of the existing standardized VTR will be slightly different from the tracks formed on the tape 19 in the still picture recording mode of the apparatus according to the present invention, it is possible to reproduce the recorded video signal satisfactorily on the standardized VTR.

Figure 5:
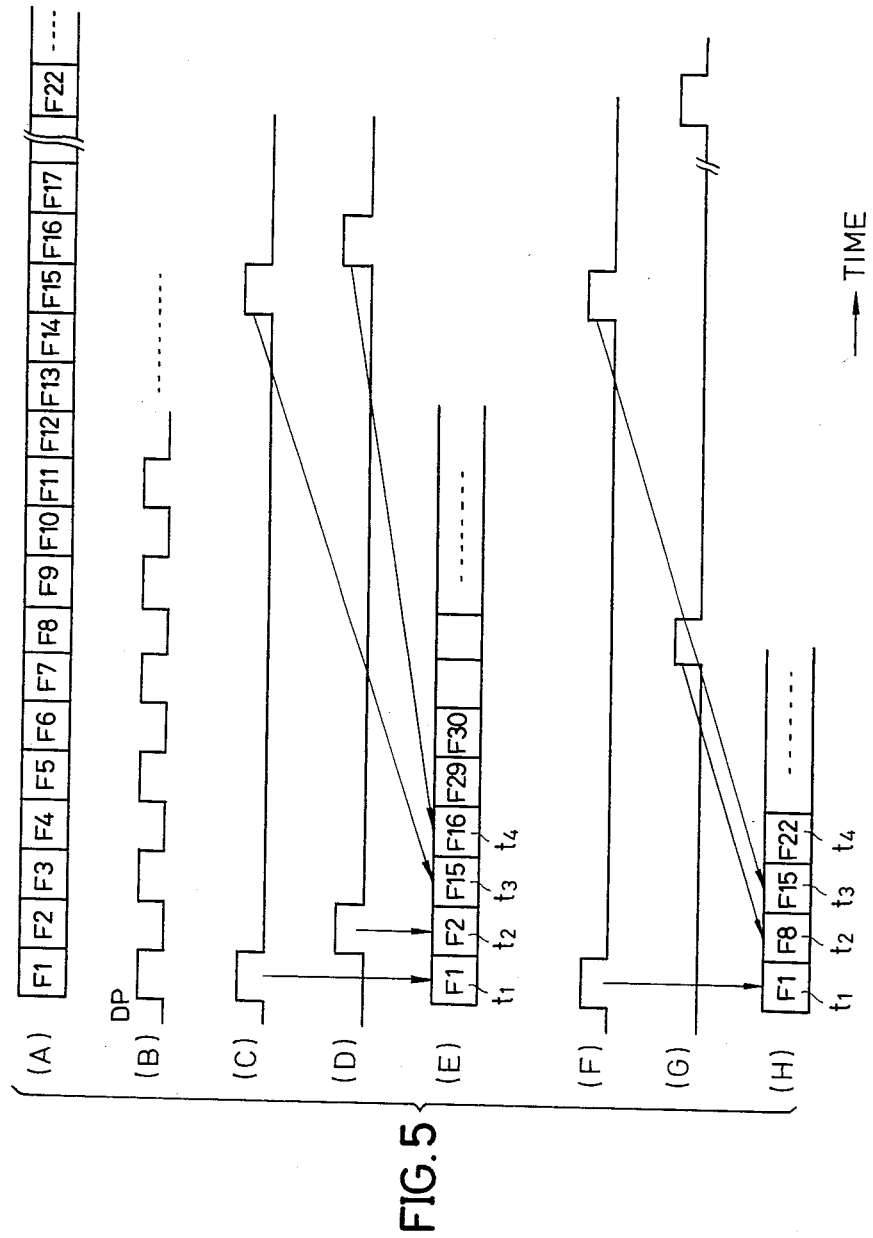
FIGS. 5(A) through 5(H) are timing charts for explaining the operation of the apparatus shown in FIG. 1.

Next, a more detailed description will be given on the recording operation referred heretofore. The video signal applied to the input terminal 28 is shown schematically in FIG. 5(A) in units of one field as fields F1, F2, F3, ..., and the drum pulse signal DP shown in FIG. 5(B) is supplied to the counter 26 from the drum servo circuit 25. In FIGS. 5(A), 5(E) and 5(H), F denotes a time period of one field and an affix numeral on F denotes the field number.

For example, when the still picture recording operation is to be carried out in the frame recording mode for the recording time 12 hours (that is, a switch 13b is manipulated), an operation control signal shown in FIG. 5(C) which has a high level with a period of 14 fields (7 frames) in only the fields F1, F15, ... is supplied to the CH1 amplifier 30. In addition, an operation control signal shown in FIG. 5(D) which has a high level with a period of 14 fields (7 frames) in only the fields F2, F16, ... is supplied to the CH2 amplifier 31. The CH1 and CH2 amplifiers 30 and 31 respectively operate only for one field during the high-level period of the operation control signal supplied thereto so as to amplify the processed video signal from the video signal processing circuit 29 in that one field.

On the other hand, the driving circuit 16 generates a driving control signal for rotating the capstan motor 22 for a time required to transport the tape 19 the distance of two track pitches and then stop the capstan motor 22, within a time interval of 12 fields from a time immediately after a fall in the operation control signal which is shown in FIG. 5(D) and is supplied to the CH2 amplifier 31 to a time immediately before a rise in the operation control signal which is shown in FIG. 5(C) and is supplied to the CH1 amplifier 30.

Hence, the video signal is recorded on the tracks $t_1$, $t_2$, ... in the field sequence shown in FIG. 5(E). In other words, while the tape 19 is stationary, the head 33 record the video signal related to the field F1 by forming the track $t_1$ shown in FIG. 4, and the head 34 thereafter records the video signal related to the field F2 by forming the track $t_2$. Then, the tape 19 is transported the distance of two track pitches and stopped. While the tape 19 is stationary, the head 33 records the video signal related to the field F15 by forming the track $t_3$, and the head 34 thereafter records the video signal related to the field F16 by forming the track $t_4$. Similarly thereafter, the operation of transporting the tape 19 the distance of two track pitches, stopping the tape transport and recording video signals related to two consecutive fields on two consecutive tracks by the heads 33 and 34 is repeated. In other words, video signals amounting to one frame are recorded on two consecutive tracks by the heads 33 and 34 during each time period in which the tape 19 is stationary.

On the other hand, when the still picture recording operation is to be carried out in the field recording mode for the recording time of 12 hours (that is, the switch 13a is manipulated), an operation control signal shown in FIG. 5(F) which has a high level with a period of 14 fields (7 frames) in only the fields F1, F15, ... is supplied to the CH1 amplifier 30. In addition, an operation control signal shown in FIG. 5(G) which has a high level with a period of 14 fields (7 frames) in only the fields F8, F22, ... is supplied to the CH2 amplifier 31. The CH1 and CH2 amplifiers 30 and 31 respectively operate only for one field during the high-level period of the operation control signal supplied thereto so as to amplify the processed video signal from the video signal processing circuit 29 in that one field.

On the other hand, the driving circuit 16 generates a driving control signal for rotating the capstan motor 22 for a time required to transport the tape 19 the distance of two track pitches and then stop the capstan motor 22, within a time interval of 6 fields (3 frames) from a time immediately after a fall in the operation control signal which is shown in FIG. 5(G) and is supplied to the CH2 amplifier 31 to a time immediately before a rise in the operation control signal which is shown in FIG. 5(F) and is supplied to the CH1 amplifier 30.

Hence, the video signal is recorded on the tracks $t_1$, $t_2$, ... in the field sequence shown in FIG. 5(H). In other words, while the tape 19 is stationary, the head 33 records the video signal related to the field F1 by forming the track $t_1$ shown in FIG. 4, and the head 34 records the video signal related to the field F8 by forming the track $t_2$ 6 fields after the formation of the track $t_1$ is completed. Then, the tape 19 is transported the distance of two track pitches and stopped. While the tape 19 is stationary, the head 33 records the video signal related to the field F15 by forming the track $t_3$, and the head 34 records the video signal related to the field F22 by forming the track $t_4$ 6 fields after the formation of the track $t_3$ is completed. Similarly thereafter, the operation of the transporting the tape 19 the distance of two track pitches once in every 14 fields, stopping the tape transport and recording the video signal related to one field once in every 7 fields so as to record video signals related to two fields on two consecutive tracks by the heads 33 and 34 is repeated. In other words, when the video signal related to a certain field is recorded on the first of the two consecutive tracks, the video signal recorded on the second of the two consecutive tracks is related to a field 7 fields after the certain field.

When the tape 19 recorded in the field recording mode is played in the still picture reproduction mode of the apparatus of the present invention, the video signals related to fields having a difference of 7 fields are alternately reproduced by the heads 33 and 34. As a result, two field images (two still pictures) having a mutual time difference of 7 fields are alternately displayed on a monitor (not shown), but to the human eyes, the two still pictures look as if they are displayed simultaneously. For this reason, when a television camera is set on an express way, the image of a moving automobile is picked up together with a scale for measuring distance and the picked up image is recorded in the field recording mode, it is possible to determine the moving speed of the automobile by reading the distance (m) between the automobiles in the two simultaneously displayed still pictures on the monitor and calculating the moving speed as follows, where A denotes the number of dropped fields and is equal to seven in the case described before.

$$\text{Moving speed} = \text{distance}/(A \times 16.7 \times 10^{-3})(m/sec)$$

Figure 6:
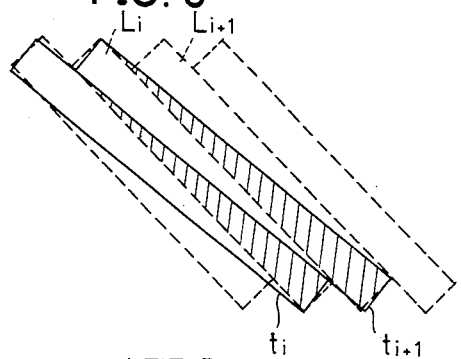
FIG. 6 shows scanning loci of heads in a standard reproduction mode together with tracks formed on the magnetic tape in the time lapse (still picture) recording mode for a first arrangement of heads.
Figure 7:
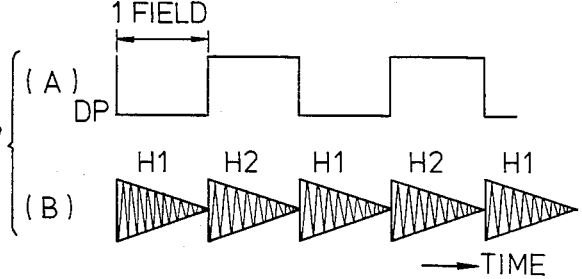
FIGS. 7(A) and 7(B) are timing charts for explaining the standard reproduction in FIG. 6.

As is well known, the tracks formed on the tape 19 while the tape 19 is stationary and the tracks formed on the tape 19 while the tape 19 is transported have mutually different inclination. It will be assumed that the relative height positions of the heads of the standardized VTR are the same as the height position of the head 34, that is, the heads 34, 38 and 39 have the same height position on the rotary drum 17. In this case, when tracks $t_i, t_{i+1}, \ldots$ are formed on the tape 19 in the still picture recording mode as shown in FIG. 6 and this tape 19 is played in the standard reproduction mode of the standardized VTR, one head of the standardized VTR scans along a locus $L_i$ indicated by a phantom line during a first one-half revolution of the rotary drum and the other head of the standardized VTR scans along a locus $L_{i+1}$ indicated by a phantom line during a second one-half revolution of the rotary drum. Hence, during the first one-half revolution, a portion of the track $t_i$ indicated by hatchings is scanned by one head having the gap with the same azimuth angle as that of the head which recorded the track $t_i$, and during the second one-half revolution, a portion of the track $t_{i+1}$ indicated by hatchings is scanned by the other head having the gap with the same azimuth angle as that of the head which recorded the track $t_{i+1}$. As a result, the tracks $t_i$ and $t_{i+1}$ are not fully scanned by the heads of the standardized VTR in the standard reproduction mode, and it is impossible to obtain a reproduced picture having a satisfactory picture quality from the video signals reproduced from the two successive tracks $t_i$ and $t_{i+1}$. FIG. 7(B) shows the reproduced FM signals from the two heads of the standardized VTR with reference to FIG. 7(A) which shows the drum pulse signal DP indicative of each field, where H1 and H2 respectively indicate the reproduced FM signals from the two heads of the standardized VTR.

Figure 8:
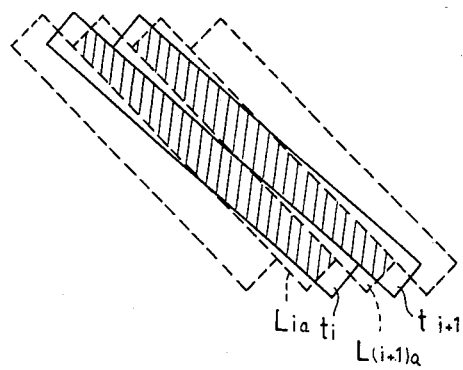
FIG. 8 shows scanning loci of heads in the standard reproduction mode together with tracks formed on the magnetic tape in the time lapse (still picture) recording mode for a second arrangement of heads.
Figure 9:
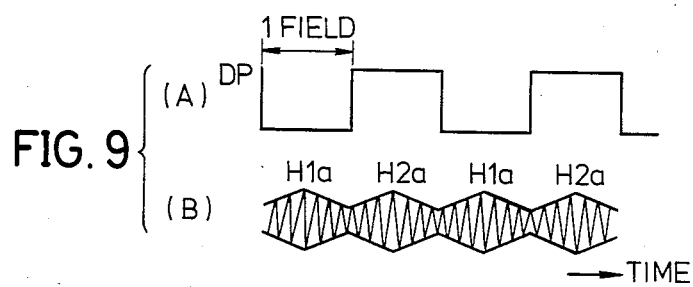
FIGS. 9(A) and 9(B) are timing charts for explaining the standard reproduction in FIG. 8.

However, when the relative height positions of the heads of the standardized VTR, that is, the heads 38 and 39, are shifted by one-half track pitch (P/2) with respect to the height position of the head 34 as shown in FIG. 2, the tracks $t_i, t_{i+1}, \ldots$ formed on the tape 19 in the still picture recording mode can be scanned satisfactorily by the heads of the standardized VTR (that is, the heads 38 and 39) in the standard reproduction mode of the standardized VTR. As shown in FIG. 8, one head of the standardized VTR scans along a locus $L_{ia}$ indicated by a phantom line during a first one-half revolution of the rotary drum and the other head of the standardized VTR scans along a locus $L_{(i+1)a}$ indicated by a phantom line during a second one-half revolution of the rotary drum. Hence, during the first one-half revolution, a large portion of the track $t_i$ indicated by hatchings is scanned by one head having the gap with the same azimuth angle as that of the head which recorded the track $t_i$, and during the second one-half revolution, a large portion of the track $t_{i+1}$ indicated by hatchings is scanned by the other head having the gap with the same azimuth angle as that of the head which recorded the track $t_{i+1}$. As a result, the tracks $t_i$ and $t_{i+1}$ are substantially scanned by the heads of the standardized VTR in the standard reproduction mode, and it is possible to obtain a reproduced picture having a satisfactory picture quality from the video signals reproduced from the two successive tracks $t_i$ and $t_{i+1}$. FIG. 9(B) shows the reproduced FM signals from the two heads of the standardized VTR with reference to FIG. 9(A) which shows the drum pulse signal DP indicative of each field, where H1$a$ and H2$a$ respectively indicate the reproduced FM signals from the two heads of the standardized VTR.

Therefore, it may be understood that the tracks formed on the tape 19 by the heads 33 and 34 in the still picture reproduction mode of the apparatus according to the present invention can be reproduced in the standard reproduction mode of the standardized VTR. In addition, from the description of FIG. 8, it may be readily understood that the tracks formed on the tape by the heads (that is, the heads 38 and 39) of the standardized VTR in the standard recording mode can be reproduced by the heads 33 and 34 of the apparatus according the present invention in a time lapse reproduction mode in which the tape is transported intermittently and the signal reproduction by the heads 33 and 34 takes place while the tape is stationary, similarly as in the case of the still picture (time lapse) recording mode. In other words, the tape recorded in the still picture (image lapse) recording mode of the apparatus according the present invention (using the heads 33 and 34) is compatibly playable in the standard reproduction mode of the standardized VTR, and the tape recorded in the standard recording mode of the standardized VTR is compatibly playable in the time lapse reproduction mode of the apparatus according to the present invention using the heads 33 and 34.

Although description thereof will be omitted, it is evident that the perfect reproduction is possible when the tracks on the tape recorded in the time lapse recording mode by use of the heads 33 and 34 are reproduced in the time lapse reproduction mode by use of the same heads 33 and 34, and the tracks on the tape recorded in the standard recording mode by use of the heads 38 and 39 are reproduced in the standard reproduction mode by use of the same heads 38 and 39 (that is, the heads of the standardized VTR).

On the other hand, it should be noted that the rotation frequency of the rotary drum 17 is constant for all the recording and reproduction modes. However, the tape 19 is stationary in the time lapse recording and reproduction modes of the apparatus according to the present invention using the heads 33 and 34 and also in the still picture reproduction mode of the standardized VTR. In other words, when the tape 19 recorded in the still picture recording mode in the apparatus according to the present invention is played in the standard reproduction mode of the standardized VTR and when the tape recorded in the standard recording mode of the standardized VTR is played in the time lapse reproduction mode of the apparatus according to the present invention using the heads 33 and 34, the relative velocity between the tape and the head becomes different from that at the time of the recording. In other words, when the tape 19 recorded in the still picture recording mode by use of the heads 33 and 34 is played in the standard reproduction mode by use of the heads 38 and 39, a difference of $-1.5H$ occurs between the lengths of the vertical synchronizing periods in the recording and reproduction modes, where H denotes one horizontal scanning period. Similarly, when the tape recorded in the standard recording mode by use of the heads 38 and 39 is played in the time lapse reproduction mode using the heads 33 and 34, a difference of $+1.5H$ occurs between the lengths of the vertical synchronizing periods in the recording and reproduction modes. These differences of $-1.5H$ and $+1.5H$ occur for the case where the ½ inch magnetic tape is used and the NTSC system video signal is recorded and reproduced. For this reason, the so-called dancing phenomenon amounting to 3H occur in which the reproduced picture looks as if it moves up and down.

Figure 10:
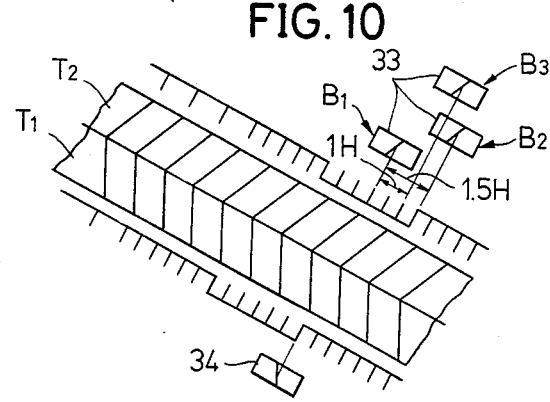
FIG. 10 shows a portion of a track pattern for explaining the difference in the vertical synchronizing periods caused by the difference in the relative scanning velocities between the tape and the head in the recording and reproduction modes.
Figure 11:
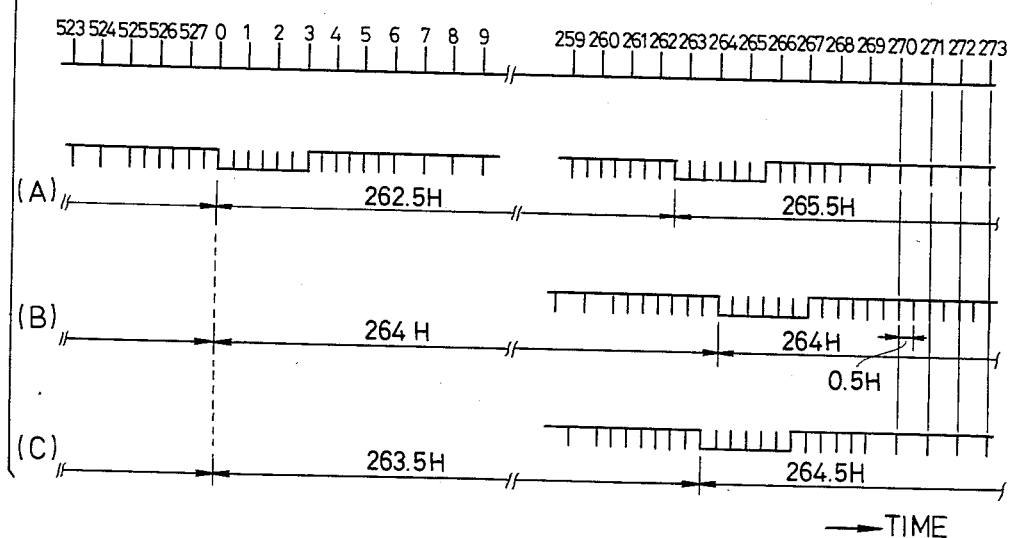
FIGS. 11(A) through 11(C) are timing charts for explaining the difference in the vertical synchronizing periods caused by the difference in the relative scanning velocities between the tape and the head in the recording and reproduction modes.

The dancing phenomenon will now be described with reference to FIGS. 10 and 11. In FIG. 10, it will be assumed that a track T1 is recorded by the head 39 and a track T2 is recorded by the head 38. The recorded composite synchronizing signals are illustrated beside the respective tracks T1 and T2. When the heads 33 and 34 have an angular separation of 180° on the rotational plane of the rotary drum 17 and the rotary drum 17 is rotated 180° from the rotary position where the head 34 is located at a position shown in FIG. 10, the head 33 reaches a position $B_1$. When the head 33 is at the position $B_1$, the head 33 is already within the vertical synchronizing period and the difference of 1.5H occurs in the vertical synchronizing period scanned by the head 34. In this case, as shown in FIG. 11(A), a difference of 3H is introduced between the number of Hs scanned by the heads 33 and 34. The numbers shown above FIG. 11(A) indicate the horizontal scanning periods (or horizontal scanning line numbers).

In order to compensate for the difference of 3H in the number of Hs scanned by the heads 33 and 34, it is possible to either use an electrical compensating means or a mechanical compensating means. When the former is employed, the signal from the head 34 should be delayed by 1.5H with respect to the signal from the head 33 so that the number of Hs scanned by the head 33 and the number of Hs scanned by the head 34 become the same. In this case, due to the electrical delay, the effect becomes the same as if the head 33 is located at a position $B_2$ in FIG. 10 after the rotary drum 17 is rotated 180° from the rotary position where the head 34 is located at the position shown in FIG. 10, and the difference in the number of Hs scanned by the heads 33 and 34 is eliminated as shown in FIG. 11(B), and the lengths of the vertical synchronizing periods become the same. However, as may be seen from FIG. 11(B), the H-alignment no longer exists and the recorded positions of the horizontal synchronizing signals differ by 0.5H along the longitudinal direction of the tracks between the two successive tracks, thereby causing deterioration in the reproduced picture.

On the other hand, the problem described above also occurs when the tracks recorded by the heads 33 and 34 are scanned by the heads 38 and 39. In addition, since the standardized VTR is not equipped with the electrical compensating means to compensate for the difference of 3H in the reproduction mode, it is preferable to carry out the compensation in the recording mode of the time lapse VTR from the point of view of making the magnetic tape compatibly playable on the standardized VTR.

Figure 12:
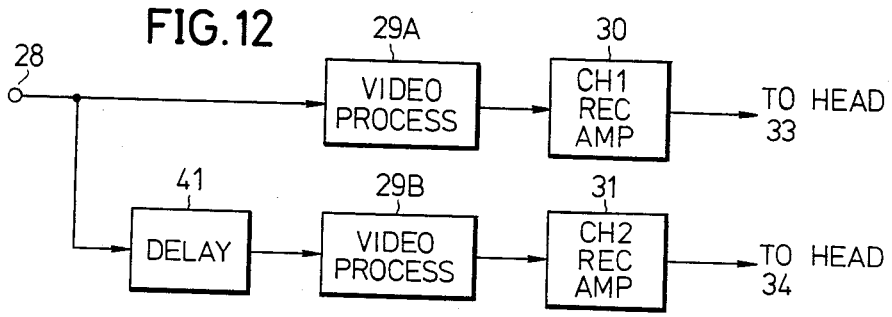
FIG. 12 is a system block diagram showing a modification of a portion of the apparatus shown in FIG. 1 for carrying out an electrical compensation to compensate for the difference in the vertical synchronizing periods.

FIG. 12 shows a modification of a part of the apparatus shown in FIG. 1 for carrying out the electrical compensation in the recording mode. In FIG. 12, those parts which are the same as those corresponding parts in FIG. 1 are designated by the same reference numerals, and description thereof will be omitted. The video signal from the input terminal 28 is supplied directly to a video signal processing circuit 29A, but the video signal from the input terminal 28 is supplied to a video signal processing circuit 29B via a delay circuit 41 which delays the signal by 1H. Output signals of the video signal processing circuit 29A and 29B are supplied to the respective CH1 and CH2 amplifiers 30 and 31. For example, a charge coupled device (CCD) may be used for the delay circuit 41.

Hence, in the present modification, the signal supplied to the head 34 during the recording is delayed by 1H with respect to the signal supplied to the head 33 so that, in effect, the head 33 is located at a position $B_3$ in FIG. 10 after the rotary drum 17 is rotated 180° from the rotary position where the head 34 is located at the position shown in FIG. 10. In this case, the difference in the number of Hs scanned by the heads 33 and 34 becomes 0.5H as shown in FIG. 11(C), and the dancing phenomenon amount to 1H is caused thereby. But such a difference of 0.5H is negligible and does not cause problems from the practical point of view. In addition, the difference of 0.5H enables the H-alignment to be maintained between the two successive tracks, and as a whole, it is possible to obtain a reproduced picture having a high picture quality.

Similarly, although the number of Hs scanned will be different from the above case, it is also possible to satisfactorily scan the tracks recorded by the heads 33 and 34 in the still picture recording mode in the standard reproduction mode by use of the heads 38 and 39 having the gap with the same azimuth angle as that of the head which recorded the track.

Figure 13:
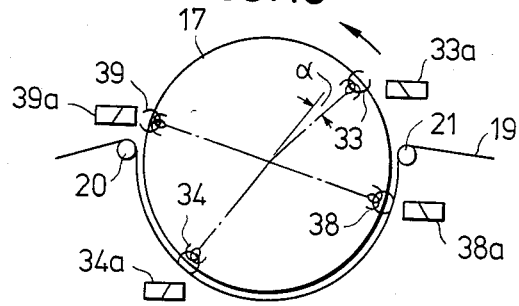
FIG. 13 is a plan view showing an essential part of a second embodiment of the video signal recording and reproducing apparatus according to the present invention.

On the other hand, it is possible to employ the mechanical compensating means to compensate for the difference to 3H in the number of Hs scanned by the heads 33 and 34 between the head 34 and the head 33 located at the position $B_1$ in FIG. 10. Description will now be given with respect to a second embodiment of the present invention which employs such mechanical compensating means, by referring to FIG. 13. In FIG.

13, those parts which are the same as those corresponding parts in FIG. 3 are designated by the same reference numerals, and description thereof will be omitted. In the present embodiment, the head 33 is closer to the head 38 by an angle α on the rotational plane of the rotary drum 17 than a position diametrically opposite the head 34. This angle α corresponds to 1H. In the present embodiment, there is no need to use the modification shown in FIG. 12, and the system shown in FIG. 1 may be used as it is and carry out the compensation described before.

Figure 14A:
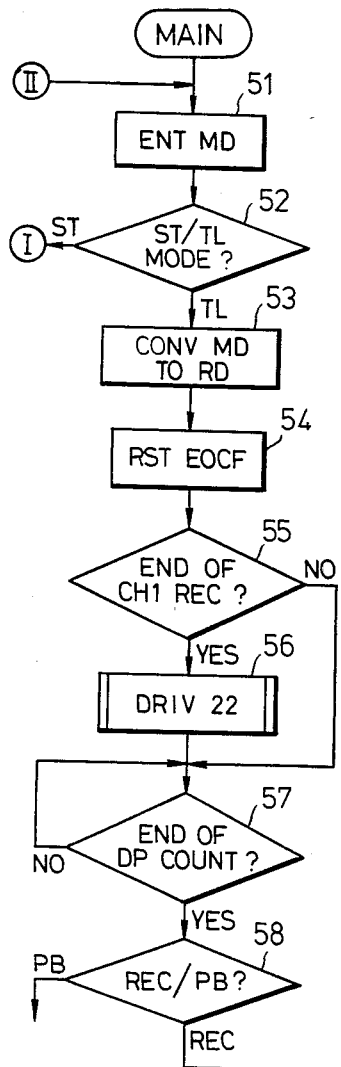

In the first and second embodiments, the operations of the data converting part 14, the counter 26, the coincidence detecting circuit 27, the recording amplifier control circuit 15 and the driving circuit 16 may be realized by a microcomputer. FIGS. 14A through 14C are flow charts for explaining the operation of the microcomputer. A step enters the mode datum (MD) from the mode datum converting part 11, and a step 52 discriminates whether the standard mode or the time lapse mode is selected. When the standard mode is selected, the operation advances to the steps shown in FIG. 14B which will be described later. On the other hand, when the time lapse mode is selected, a step 53 converts the mode datum into a RAM datum RD which is to be set in a random access memory (RAM) of the microcomputer. A counter of the microcomputer starts counting down the pulses of the drum pulse signal DP from the set RAM datum RD in the RAM in a drum pulse counting interrupt routine shown in FIG. 14C so as to skip a predetermined number of fields depending on the selected mode and recording time. The following Tables 2 and 3 respectively shown the recording intervals for the frame recording mode and the field recording mode, and the following Table 4 shows the RAM data RD in correspondence with the recording time. A step 54 resets an end of count flag EOCF. A step 55 discriminates whether or not the field recording of the video signal from the CH1 amplifier 30 is ended. The operation advances to a step 57 when the discrimination result in the step 55 is NO.

TABLE 2

| Frame Rec Mode | Recording Interval |
| --- | --- |
| 8 Hrs | 1 Frame for every 4 Frames |
| 12 Hrs | 1 Frame for every 7 Frames |
| 24 Hrs | 1 Frame for every 13 Frames |
| 36 Hrs | 1 Frame for every 19 Frames |
| 60 Hrs | 1 Frame for every 31 Frames |
| 120 Hrs | 1 Frame for every 61 Frames |

TABLE 3

| Field Rec Mode | Recording Interval |
| --- | --- |
| 12 Hrs | 1 Field for every 3.5 Frames |
| 24 Hrs | 1 Field for every 6.5 Frames |
| 48 Hrs | 1 Field for every 12.5 Frames |
| 72 Hrs | 1 Field for every 18.5 Frames |
| 120 Hrs | 1 Field for every 30.5 Frames |
| 240 Hrs | 1 Field for every 60.5 Frames |

TABLE 4

| RAM Data RD (Hex) | Recording Time (Frame/Field Mode) |
| --- | --- |
| 01 | 8/12 |
| 04 | 12/24 |
| 0A | 24/48 |
| 10 | 36/72 |
| 1C | 60/120 |
| 3A | 120/240 |

On the other hand, when the discrimination result in the step 55 is YES, a step 56 drives the capstan motor 22. The step 56 is actually a subroutine for driving the capstan motor 22, but description thereof will be omitted since the subroutine is not directly related to the subject matter of the present invention. The step 57 discriminates from the end of count flag EOCF whether or not the counting of the drum pulse signal DP is ended. The step 57 is carried out until the discrimination result therein becomes YES, and a step 58 then discriminates whether the recording mode (REC) or the reproduction mode (PB) is selected. The description for the case where the reproduction mode is selected will be omitted. In the case where the recording mode is selected, a step 59 discriminates whether the field recording mode or the frame recording mode is selected.

Figure 14A:
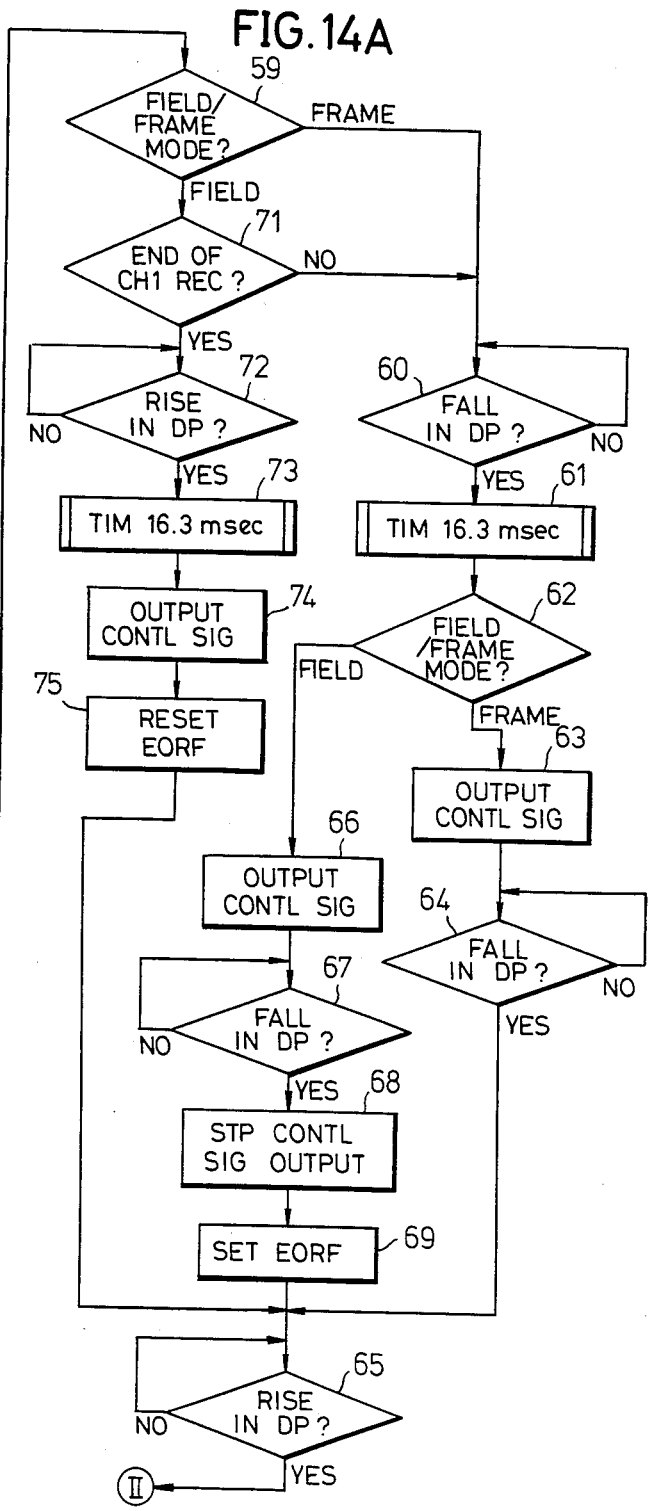

The drum pulse counting interrupt routine shown in FIG. 14 is carried out when the pulse of the drum pulse signal DP is detected in the main routine. A step decrements the RAM datum RD stored in the RAM by one and a step 81 discriminates whether or not the RAM datum is FF in hexadecimal. The operation is returned to the main routine shown in FIG. 14A when the discrimination result in the step 81 is NO. On the other hand, when the discrimination result in the step 81 is YES, a step 82 sets the end of count flag EOCF and the operation is returned to the main routine.

When the frame recording mode is selected, a step 60 discriminates whether or not a fall in the drum pulse signal DP is detected, and the step 60 is carried out until the discrimination result therein becomes YES. A step 61 starts a timer for timing 16.3 msec. A step 62 discriminates whether the field recording mode or the frame recording mode is selected. A step 63 supplies the operation control signals to the CH1 and CH2 amplifiers 30 and 31, and a step 64 discriminates whether or not a fall in the drum pulse signal DP is detected. The step 64 is carried out until the discrimination result therein becomes YES, and a step 65 discriminates whether or not a rise in the drum pulse signal DP is detected. The step 65 is carried out until the discrimination result therein becomes YES, and the operation is then returned to the step 51.

On the other hand, when it is discriminated in the step 62 that the field recording mode is selected, a step 66 supplies the operation control signal to the CH1 amplifier 30, and a step 67 discriminates whether or not a fall in the drum pulse signal DP is detected. The step 67 is carried out until the discrimination result therein becomes YES, and a step 68 stops supplying the operation control signal to the CH1 amplifier 30. A step 69 sets an end of CH1 recording flag EORF, and the operation advances to the step 65 described before.

When it is discriminated in the step 59 that the field recording mode is selected, a step 71 discriminates whether or not the field recording of the video signal from the CH1 amplifier 30 is ended. The operation advances to the step 60 when the discrimination result in the step 71 is NO. But when the discrimination result in the step 71 is YES, a step 72 discriminates whether or not a rise in the drum pulse signal DP is detected. The step 72 is carried out until the discrimination result therein becomes YES, and a step 73 starts a timer for timing 16.3 msec. A step 74 supplies the operation control signal to the CH2 amplifier 31, and a step 75 resets the end of CH1 recording flag EORF. The operation advances to the step 65 after the step 75.

In the case of the field recording mode, the capstan motor 22 is driven intermittently after the recording of two fields is completed. In other words, the capstan motor 22 need not be driven when the recording of CH1 (that is, the recording by the head 33) is completed, and the capstan motor 22 is driven after the recording of CH2 (that is, the recording by the head 34) is completed. For this reason, the end of CH1 recording flag EORF is set after the recording of CH1 is completed so that the end of CH1 recording flag EORF may be used to determined whether or not the capstan motor 22 is to be driven. The timer times 16.3 msec in the described embodiment in order to provide the so-called overlap recording of video tracks for the purpose of ensuring tape interchangeability among apparatuses and compensating for a jitter in the rotation of the rotary drum 17, however, in principle, there is no need to time 16.3 msec to obtain the effects of the present invention.

FIG. 15A schematically shows the operation of the microcomputer for the case where the frame recording mode with the recording time of 12 hours is selected. As may be seen from Table 4, the RAM datum RD is set to "04" in hexadecimal because when the recording is to be carried out for every 7 frames, the RAM datum RD must be set to a number which is 3 less than 7 due to the fact that a borrow signal is outputted when the count in the counter of the microcomputer changes from "0" to "F". In FIG. 15A, the CH1 and CH2 amplifiers 30 and 31 are respectively controlled for one frame and not for one field as described before in conjunction with FIGS. 1 and 5. However, the effect thereof is essentially the same.

FIG. 15B schematically shows the operation of the microcomputer for the case where the field recording mode with the recording time of 12 hours is selected. As may be seen from Table 4, the RAM datum RD is set to "01" in hexadecimal.

Description will now be given with respect to the flow chart shown in FIG. 14B. When the step 52 shown in FIG. 14A discriminates that the standard mode is selected, a step 90 in FIG. 14B discriminates whether the recording mode or the reproduction mode is selected. When the recording mode is selected, a step 91 discriminates whether or not a recording flag RECF which indicates that the recording is being carried out is set. The operation advances to the step 51 shown in FIG. 14A when the discrimination result in the step 91 is YES. On the other hand, when the discrimination result in the step 91 is NO, a step 92 discriminates whether or not a fall in the drum pulse signal DP is detected. The step 92 is carried out until the discrimination result therein becomes YES, and a step 93 starts a timer for timing 16.3 msec. A step 93 supplies the operation control signals to the CH1 and CH2 amplifiers 30 and 31, and a step 95 sets the recording flag RECF. The operation advances to the step 51 after the step 95.

On the other hand, when the step 90 discriminates that the reproduction mode is selected, a step 96 discriminates whether or not the recording flag RECF is set. The operation advances to the step 51 shown in FIG. 14A when the discrimination result in the step 91 is NO. On the other hand, when the discrimination result in the step 96 is YES, a step 97 discriminates whether or not a rise in the drum pulse signal DP is detected. The step 97 is carried out until the discrimination result therein becomes YES, and a step 98 stops the supplying the operation control signals to the CH1 and CH2 amplifiers 30 and 31, and a step 99 resets the recording flag RECF. The operation advances to the step 51 after the step 99.

Further, the present invention is not limited to these embodiments, but various variations and modifications may be made without departing from the scope of the present invention.

What is claimed is:

1. A helical scan type video signal recording and reproducing apparatus comprising:

a rotary body mounted with a pair of rotary magnetic heads at positions having an angular separation of $180° + \alpha$ on a rotational plane of the rotary body, where $\alpha$ is an angle smaller than 90°, said pair of rotary magnetic heads having mutually different height positions along an axial direction of the rotary body;

transporting means for intermittently transporting a magnetic tape which is wrapped obliquely around a peripheral surface of the rotary body for a predetermined angular range;

recording and reproducing means for successively recording a video signal on a pair of successive tracks of the magnetic tape by use of the pair of rotary magnetic heads, and for successively reproducing the video signal from the pair of successive tracks of the magnetic tape by use of the pair of rotary magnetic heads; and control means for repetitively causing said transporting means to transport the tape a predetermined constant distance and to stop transport of the tape and said recording and reproducing means to record in a time lapse recording mode and to reproduce in a time lapse reproduction mode a video signal amounting to one field on each track of the pair of successive tracks.

2. A helical scan type video signal recording and reproducing apparatus as claimed in claim 1 in which said pair of rotary magnetic heads have a height difference amounting to P, where P denotes one track pitch between two successive tracks on the magnetic tape.

3. A helical scan type video signal recording and reproducing apparatus as claimed in claim 1 in which said angle $\alpha$ is selected to be an angle corresponding to one horizontal scanning period of the video signal.

4. A helical scan type video signal recording and reproducing apparatus as claimed in claim 1 in which said control means causes said recording and reproducing means to record in the time lapse recording mode on the pair of successive tracks on the magnetic tape video signals related to fields having a mutual time difference amounting to a predetermined number of fields.

5. A helical scan type video signal recording and reproducing apparatus as claimed in claim 1 in which said control means causes said recording and reproducing means to record in the time lapse recording mode on the pair of successive tracks on the magnetic tape video signals related to two successive fields.

6. A helical scan type video signal recording and reproducing apparatus as claimed in claim 1 which further comprises selecting means for selectively carrying out a recording operation in a field recording mode or a frame recording mode so that said control means in the field recording mode causes said recording and reproducing means to record on the pair of successive tracks on the magnetic tape video signals related to fields having a mutual time difference amounting to a predetermined number of fields and said control means in the frame recording mode causes said recording and reproducing means to record on the pair of successive tracks on the magnetic tape video signals related to two successive fields.

7. A helical scan type video signal recording and reproducing apparatus as claimed in claim 1 which further comprises a pair of standard rotary magnetic heads which are mounted at diametrical positions on the rotary body at the same height position in conformance with standards of a standardized helical scan type video recording and reproducing apparatus, another transporting means for continuously transporting the magnetic tape in standard recording and reproduction modes, and another recording and reproducing means for successively recording and reproducing video signals on and from the magnetic tape by the pair of standard rotary magnetic heads, said control means in the standard recording and reproduction modes causing said another recording and reproducing means to record and reproduce video signals each amounting to one field on and from each track by the pair of standard rotary magnetic heads while the magnetic tape is transported continuously, the height position of said pair of standard rotary magnetic heads being P/2 higher than the height position of a higher one of said pair of rotary magnetic heads having the mutually different height positions, where P denotes one track pitch between two successive tracks on the magnetic tape.

8. A helical scan type video signal recording and reproducing apparatus comprising:
   a rotary body mounted with a pair of rotary magnetic heads at positions having an angular separation of 180° on a rotational plane of the rotary body, said pair of rotary magnetic heads having mutually different height positions along an axial direction of the rotary body;
   transporting means for intermittently transporting a magnetic tape which is wrapped obliquely around a peripheral surface of the rotary body for a predetermined angular range;
   recording and reproducing means for successively recording a video signal on a pair of successive tracks of the magnetic tape by use of the pair of rotary magnetic heads, and for successively reproducing the video signal from the pair of successive tracks of the magnetic tape by use of the pair of rotary magnetic heads;
   control means for repetitively causing said transporting means to transport the tape a predetermined constant distance and to stop transport of the tape and said recording and reproducing means to record in a time lapse recording mode and to reproduce in a time lapse reproduction mode a video signal amounting to one field on each track of the pair of successive tracks; and
   means for delaying the video signal which is supplied to one of the pair of rotary magnetic heads by a predetermined time with respect to the video signal which is supplied to the other of the pair of rotary magnetic heads in the time lapse recording mode.

9. A helical scan type video signal recording and reproducing apparatus as claimed in claim 8 in which said pair of rotary magnetic heads have a height difference amounting to P, where P denotes one track pitch between two successive tracks on the magnetic tape.

10. A helical scan type video signal recording and reproducing apparatus as claimed in claim 8 in which said predetermined time is selected to be one horizontal scanning period of the video signal.

11. A helical scan type video signal recording and reproducing apparatus as claimed in claim 8 in which said control means causes said recording and reproducing means to record in the time lapse recording mode on the pair of successive tracks on the magnetic tape video signals related to fields having a mutual time difference amounting to a predetermined number of fields.

12. A helical scan type video signal recording and reproducing apparatus as claimed in claim 8 in which said control means causes said recording and reproducing means to record in the time lapse recording mode on the pair of successive tracks on the magnetic tape video signals related to two successive fields.

13. A helical scan type video signal recording and reproducing apparatus as claimed in claim 8 which further comprises selecting means for selectively carrying out a recording operation in a field recording mode or a frame recording mode so that said control means in the field recording mode causes said recording and reproducing means to record on the pair of successive tracks on the magnetic tape video signals related to fields having a mutual time difference amounting to a predetermined number of fields and said control means in the frame recording mode causes said recording and reproducing means to record on the pair of successive tracks on the magnetic tape video signals related to two successive fields.

14. A helical scan type video signal recording and reproducing apparatus as claimed in claim 8 which further comprises a pair of standard rotary magnetic heads which are mounted at diametrical positions on the rotary body at the same height position in conformance with standards of a standardized helical scan type video recording and reproducing apparatus, another transporting means for continuously transporting the magnetic tape in standard recording and reproduction modes, and another recording and reproducing means for successively recording and reproducing video signals on and from the magnetic tape by the pair of standard rotary magnetic heads, said control means in the standard recording and reproduction modes causing said another recording and reproducing means to record and reproduce video signals each amounting to one field on and from each track by the pair of standard rotary magnetic heads while the magnetic tape is transported continuously, the height position of said pair of standard rotary magnetic heads being P/2 higher than the height position of a higher one of said pair of rotary magnetic heads having the mutually different height positions, where P denotes one track pitch between two successive tracks on the magnetic tape.

* * * * *